United States Patent [19]

Cheesman et al.

[11] 3,928,558
[45] Dec. 23, 1975

[54] HAIRSPRAY COMPOSITIONS CONTAINING A SILICONE GLYCOL BLOCK COPOLYMER

[75] Inventors: Jean Ann Cheesman, Whitton; Cherry Pamela Coles, West Ewell, both of England

[73] Assignee: Lever Brothers Company, New York, N.Y.

[22] Filed: May 29, 1973

[21] Appl. No.: 364,210

[30] Foreign Application Priority Data
May 26, 1972  United Kingdom............... 25111/72

[52] U.S. Cl. ............ 424/47; 8/127.51; 424/DIG. 1; 424/DIG. 2; 424/DIG. 4; 424/70; 424/71
[51] Int. Cl.² .......................................... A61K 7/10
[58] Field of Search............ 424/DIG. 1, DIG. 2, 70, 424/71, 47; 8/127.51

[56] References Cited
UNITED STATES PATENTS

| | | | |
|---|---|---|---|
| 2,942,008 | 6/1960 | Lubowe | 424/47 X |
| 2,953,498 | 9/1960 | Werner | 424/47 |
| 3,144,391 | 8/1964 | Goff | 424/47 X |
| 3,177,119 | 4/1965 | Zoebelein | 424/47 |
| 3,649,597 | 3/1972 | Henley | 424/71 X |
| 3,716,633 | 2/1973 | Viout et al. | 424/47 |

FOREIGN PATENTS OR APPLICATIONS
940,188  10/1963  United Kingdom.................. 424/70

OTHER PUBLICATIONS
Drug & Cosmetic Industry, Vol. 104, No. 5, p. 149.

*Primary Examiner*—Jerome D. Goldberg
*Assistant Examiner*—Vera C. Clarke
*Attorney, Agent, or Firm*—Lever Brothers Company

[57] ABSTRACT

Certain polydimethylsiloxane-polyoxyalkylene block copolymers are incorporated in hairspray compositions comprising a film-forming resin and cosmetic vehicle. These polymers, which have a silicon content of 15–25%, a molecular weight of 1200 to 5000 and a viscosity at 25°C of 3 to 10 poises, make the resin easier to brush out from the hair.

5 Claims, No Drawings

HAIRSPRAY COMPOSITIONS CONTAINING A SILICONE GLYCOL BLOCK COPOLYMER

This invention relates to hair preparations, more particularly to hairspray compositions.

The use of hairspray compositions containing a resin for holding the hair in the desired style is well known. These act by forming a film of the resin on the hair filaments, holding them together sufficiently to retain the hair in its styling for some hours. One of the disadvantages, however, of hairspray compositions is that the resin is difficult to remove effectively from the hair by brushing. Furthermore, incomplete elimination of the resin results in build-up of the resin which leads to the hair having an unnatural feel, the hair after brushing being left stiff and sticky.

It is an object of the invention to provide an improved hairspray composition containing a resin.

According to the present invention there is provided a hairspray composition comprising a cosmetic vehicle, a hairspray resin and a polydimethylsiloxane-polyoxyalkylene block copolymer, where each alkylene group is an ethylene group or a propylene group, said copolymer having a silicon content of 15% to 25% by weight, a molecular weight of from 1200 to 5000, preferably 1400 to 2500, and a viscosity at 25°C of from 3 to 10 poises, preferably 4 to 8 poises, the amount of the copolymer being from 0.5 to 15%, preferably 1 to 10%, by weight of the hairspray resin. Molecular weights referred to in this specification are number average molecular weights which are the sum of the molecular weights of the polymer molecules divided by the number of molecules.

Suitable polydimethylsiloxane-polyoxyalkylene copolymers are those comprising dimethylsiloxane ($-Si(CH_3)_2O-$) units and units of the general formula $-Si(CH_3)[(CH_2)_n(OCH_2CHR')_pOR]O$-wherein $n = 0$ or 3, each $R'$ is H or $CH_3$, $p$ represents the average number of oxyalkylene groups of R represents hydrogen or an alkyl group of 1 to 5 carbon atoms.

The above polydimethylsiloxane-polyoxyalkylene block copolymers can be prepared by methods known in the art. Thus polydimethylsiloxanes bearing reactive groups attached directly to silicon combine readily with hydroxy-functional oxyalkylene polymers forming Si—O—C linked copolymers, according to the reaction

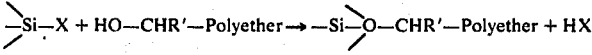

where X is H, halogen, $-OR$, $-OC(O)R$ or $-NH_2$, where R is alkyl, e.g. $CH_3$ or $C_2H_5$, and $R'$ is H or $CH_3$. Copolymers with a Si—C linkage between the polymer blocks may be made by the hydrosilylation of terminally unsaturated oxyalkylene polymers by polysiloxanes containing reactive SiH groups.

These methods are described in a paper presented by J.B. Plumb entitled "Silicone Block Copolymers" at the Annual Meeting of the Chemical Society at Manchester, England, April 1972 and are also referred to in an article entitled "Synthesis and Properties of Siloxane-Polyether Copolymer Surfactants" by B. Kanner, W. G. Reid and I. H. Petersen in I&EC Product Research and Development Volume 6, No. 2, June 1967, page 88.

The hairspray resin is preferably included in the compositions of the invention in an amount of from 0.1 to 7.5% by weight.

The hairspray resin may be any of those known to be suitable for holding the hair in a desired style. Amongst those that have found wide commercial application are polyvinylpyrrolidone; copolymers of from 92.5 to 87.5% vinyl acetate and from 7.5 to 12.5% crotonic acid as described in U.S. Pat. No. 2,996,471, e.g. National Starch Resyn 28–1310; terpolymers of from 7 to 89% vinyl acetate, 6 to 13% crotonic acid and from 5 to 80% of a vinyl ester of an alpha-branched saturated aliphatic monocarboxylic acid having a minimum of five carbon atoms in the carboxylic moiety, said acid having the formula $R_3C(R_1)(R_2)COOH$ where $R_1$ and $R_2$ are alkyl radicals and $R_3$ is selected from hydrogen, alkyl, alkaryl, aralkyl and aryl radicals, such terpolymers being described in British Specification No. 1,169,862, and similar terpolymers being described in U.S. Pat. No. 3,579,629, a commercially available terpolymer of this type being that sold under the name National Starch Resyn 28-2930; copolymers of from 20 to 60% of N-vinylpyrrolidone and from 40 to 80% of vinyl acetate such as those described in U.S. Pat. No. 3,171,784, and which copolymers are commercially available under the designations Luviskol 37E and Luviskol 28I; copolymers of maleic anhydride (1 mole) and an olefin (1 mole) containing 2 to 4 carbon atoms, particularly ethylene, said copolymer having a molecular weight of about 25,000 to 70,000, preferably being esterified to the extent of 50 to 70% with a saturated aliphatic alcohol containing from 1 to 4 carbon atoms, such as are described in U.S. Pat. No. 2,957,838 and exemplified by the material available commercially under the trade name EMA 3122; and copolymers of methyl vinyl ether and maleic anhydride (molar ratio about 1:1) and such copolymers esterified with a saturated aliphatic alcohol containing from 1 to 4 carbon atoms, an example thereof being the resin available commercially under the trade name Gantrez ES 435. However, those skilled in the art will appreciate that other resins are suitable for use in hairsprays, see for example the section entitled "Hair Lacquers or Hair Sprays" commencing on page 352 of Volume 2 of "Cosmetics Science and Technology" edited by M. S. Balsom and Edward Sagarin (1972).

Those copolymers which contain acidic groups and are water-insoluble are usually used in their neutralized water-soluble form. Suitable neutralizing agents which may be included in the hairspray composition are amines, especially aminoalcohols, preferably 2-amino-2-methyl-1,3-propanediol and 2-amino-2-methyl-1-propanol. Other suitable neutralizing agents are also given in U.S. Pat. No. 2,996,471.

The hairspray compositions of the invention comprise the hairspray resin and polydimethylsiloxane-polyoxyalkylene copolymer and, as is conventional, a suitable cosmetic vehicle, particularly an organic solvent or aqueous organic solvent. Such compositions are preferably applied from aerosol containers which are pressurized by a liquefied or permanent gas: the propellant gas may be situated in the same compartment as the product to be dispensed or in a separate compartment. The compositions can however also be applied to the head by other means, such as by mechanically operated devices of from a squeeze pack.

The organic solvents commonly used in formulating hairspray compositions are ethanol, isopropanol, methylene chloride, methoxyethanol and 2-ethoxyethanol, and mixtures thereof with water.

The propellant gases used in formulating aerosol hairsprays are well known to those skilled in the art. The propellant is usually a halogenated hydrocarbon, the fluorochlorohydrocarbons of the $C_1$ and $C_2$ alkanes being the most well known. Commonly used propellants are trichlorofluoromethane (propellant 11) and dichlorodifluoromethane (propellant 12). However, other halogenated hydrocarbons can be used such as those referred to in U.S. Pat. Nos. 3,026,250, 3,145,147 and 2,957,938, and more generally in the section entitled "Propellants" commencing on page 443 of Volume 2 of "Cosmetics Science and Technology" referred to previously.

Preferred aerosol hairsprays in accordance with this invention comprise 0.1 to 5% of the hairspray resin, the polydimethylsiloxane-polyoxyalkylene copolymer and resin being contained in a mixture of from 10 to 70% of an organic solvent and from 30 to 90% of a liquefied gaseous propellant.

Hairspray compositions of the invention for direct application to the hair from a non-pressurized spray pack preferably contain from 0.5 to 7.5% by weight of the hairspray resin, the resin and the polydimethylsiloxane-polyoxyalkylene copolymer being dissolved in an alcoholic or aqueous-alcoholic solvent.

The hairspray compositions of this invention may contain adjuvants conventionally used in compositions of this type for example plasticizers, perfumes, dyestuffs and anti-seborrhoeic agents. Suitable anti-seborrhoeic agents are described in British Specifications Nos. 1,296,102 and 1,305,358.

The invention also relates to a method of treating hair which comprises spraying hair with a composition in accordance with the invention.

The following Examples of hairspray compositions illustrate the invention. Percentages are by weight.

EXAMPLES 1 to 6

Aerosol hairsprays were formulated having the compositions set out in Table 1.

TABLE I

| Ingredient | Example: 1 | 2 | 3 | 4 | 5 | 6 |
|---|---|---|---|---|---|---|
| Copolymer of vinyl acetate (90%) and crotonic acid (10%) (National Starch Resyn 28-1310) MW about 25000 | 2.25 | — | 1.70 | — | — | — |
| Copolymer of vinyl pyrrolidone (20%) and vinyl acetate (80%) (Luviskol 28I) (50% solids) | — | 4.50 | — | — | — | — |
| Terpolymer of vinyl acetate (75%), crotonic acid (10%) and a vinyl ester of a branched chain fatty acid (15%) (National Starch Resyn 28-2930) MW about 22500 | — | — | — | 1.40 | — | — |
| Copolymer of ethylene (14%) and maleic anhydride butyl monoester (86%) with about 1 in 40 of the butyl groups replaced by a quaternary salt (EMA 3122) (50% solids) | — | — | — | — | 4.00 | — |
| Copolymer of methyl vinyl ether (25%) and maleic anhydride butyl monoester (75%) (Gantrez ES 435) (50% solids) | — | — | — | — | — | 4.00 |
| 2-amino-2-methyl-1-propanol | 0.212 | — | 0.130 | — | 0.220 | 0.110 |
| 2-amino-2-methyl-1,3-propanediol | — | — | — | 0.147 | — | — |
| Polydimethylsiloxane-polyoxyalkylene copolymer | 0.10 | 0.10 | 0.08 | 0.06 | 0.09 | 0.09 |
| Ethyl alcohol | to 40 | — | — | to 20 | to 40 | to 40 |
| Methylene chloride/isopropyl alcohol mixture (1:1.25) | — | to 60 | — | — | — | — |
| Methylene chloride/methoxy ethanol | — | — | to 45 | — | — | — |

The balance of each composition was a mixture of propellants 11 and 12. The ratio of these propellants in Examples 1, 5 and 6 was 65:35; and in Examples 2, 3 and 4 was 10:90, 50:50 and 60:40, respectively.

The polydimethylsiloxane-polyoxyalkylene block copolymer included in the above aerosol hairspray formulations comprised a plurality of dimethylsiloxane ($-Si(CH_3)_2O-$) units and a proportion of units of the average formula $-Si(CH_3)[(CH_2)_3(OCH_2 CH_2)_pOR]O-$, where p is the average number of oxyethylene units, and R is hydrogen or methyl. The copolymer had a silicon content of about 18% by weight and a number average molecular weight of about 2000. It had a viscosity of about 6 poises at 25°C.

The superiority of the above hairspray formulations over the corresponding formulations from which the polydimethyl-siloxane-polyoxyalkylene copolymer (or silicone glycol as it is sometimes referred to herein) had been omitted was demonstrated by a number of tests. These are briefly described below.

In the first test the effect of the polydimethylsiloxane-polyoxyalkylene copolymer on the ease of combing out of a hairspray was investigated. In this test switches of hair were placed in a holder and sprayed with the hairspray under test from a fixed distance. The aerosol valve was electromechanically operated and the switch holder was moved vertically past the spray at a constant speed. After drying the switches for two hours, their combing resistance was measured by drawing the switches through an aluminum comb at a constant speed. The comb was fitted with a strain gauge which translated any lateral force on the comb into a voltage output. The output was fed into an integrator which summed the total output for each combing. The cumulative work (combing resistance) in combing a switch five times was determined. The combing resistance values given below in Table II have been corrected to allow for any variation in resistance to combing of the untreated switches, so that the values given are a measure, in empirical units, of the increase in work required to comb the hair due to the applied hairspray.

TABLE II

| Formulation | Cumulative Work for Five Combings |
| --- | --- |
| Example 1 | 14 |
| Example 1 without silicone glycol | 64 |
| Example 2 | 13 |
| Example 2 without silicone glycol | 44 |
| Example 3 | 17 |
| Example 3 without silicone glycol | 59 |
| Example 4 | 8 |
| Example 4 without silicone glycol | 40 |

These results demonstrate that the presence of the polydimethylsiloxane-polyoxyalkylene copolymer improves the ease of combing of hair sprayed with hairspray compositions in accordance with the invention.

The second test concerned a subjective assessment of the ease of brush out of the hair and the feel of the hair after brushing out. Hair switches were sprayed for 10 seconds, allowed to dry for at least 3 hours and then brushed out. The number of brush strokes required to make the switch just free from resin bonding was noted. Five judges were then asked to rate the switches according to their feel (softness, smoothness, lack of stickiness) along a scale marked from 1 (best) to 10 (worst). The mean of the five ratings was obtained for each switch, two switches being used for each spray under test. The procedure was repeated for a further four sprayings, and the mean number of brush strokes and mean feel rating obtained for each spray tested. The results are given in Table III.

TABLE III

| Formulation | Mean Ranking Score for Feel After Brushing | Mean Number of Brush Strokes for Brushing Out |
| --- | --- | --- |
| Example 1 | 3.4 | 5 |
| Example 1 without silicone glycol | 7.4 | 15 |
| Example 2 | 3.9 | 3 |
| Example 2 without silicone glycol | 6.3 | 11 |
| Example 3 | 4.7 | 3 |
| Example 3 without silicone glycol | 8.0 | 7 |
| Example 4 | 4.4 | 3 |
| Example 4 without silicone glycol | 6.6 | 7 |
| Example 5 | 7.1 | 7 |
| Example 5 without silicone glycol | 7.2 | 18 |
| Example 6 | 4.6 | 6 |
| Example 6 without silicone glycol | 6.4 | 14 |

In another test that has been performed the build-up of resin on the hair with repeated use of a hairspray was examined. In this test a hairspray in accordance with this invention was compared with eight different brands of hairsprays sold in the United Kingdom. The silicone glycol employed was the same as that present in the formulations of Examples 1 to 6 and was present in an amount of 0.06%. This test was carried out by spraying a number of switches 24 cms in length for a given time. They were then left to dry for 3 hours after which they were brushed until free from resin bonding between the hairs. This procedure was repeated a further four times. The hair switches were then extracted with a suitable solvent for approximately seven hours. The solvent was evaporated off and the remaining residue weighed. The results are given in Table IV.

TABLE IV

| Hairspray Product | % Resin Content | Resin Type | Build-up of resin expressed as mg of resin per g of hair |
| --- | --- | --- | --- |
| Brand A | 2.00 | as Example 1 | 1.7 |
| Brand A + silicone glycol | | | 0.9 |
| Brand B | 2.00 | as Example 1 | 1.6 |
| Brand C | 2.25 | as Example 1 | 2.65 |
| Brand D | 3.00 | as Example 6 | 2.4 |
| Brand E | 1.60 | as Example 1 | 2.4 |
| Brand F | 2.20 | as Example 1 | 2.4 |
| Brand G | 2.00 | as Example 1 | 2.7 |
| Brand H | 1.40 | as Example 4 | 3.0 |

The results obtained clearly demonstrated that the hairspray according to the invention showed the lowest resin build-up during repeated spray and brush-out treatments.

In another comparative test that has been carried out the effect of various other silicone glycols and silicones has been compared with the effect of the silicone glycol present in hairsprays in accordance with the invention. The tests that have been performed are the combing resistance test and the ease of brush-out and feel after brush-out tests described previously.

Data obtained by analysis for the various comparative commercial silicones A to J used in this test are given below in Table V. All save silicone J, which was a methylphenyl polysiloxane, were polydimethylsiloxane-polyoxyalkylene copolymers containing either polyoxyethylene groups or polyoxypropylene groups or both kinds of groups.

TABLE V

| Silicone | % Silicon | Viscosity (poises) | Number Average MW |
| --- | --- | --- | --- |
| A | 17 | 0.2 | 800 |
| B | 11 | 3.2 | 2000 |
| C | 9 | 1.1 | 1000 |
| D | 8 | | |
| E | 8 | 19.3 | 6500 |
| F | 6 | 14.2 | |
| G | 6 | 8.0 | 4800 |
| H | 6 | 2.0 | 2000 |
| I | 5 | | 5800 |
| J | 29 | 0.04 | |

These silicones were tested in a formulation of following composition

| | % |
| --- | --- |
| Copolymer of vinyl acetate and crotonic acid (National Starch Resyn 28-1310) | 2.25 |
| 2-amino-2-methyl-1-propanol | 0.212 |
| Silicone | 0.10 |
| Ethyl alcohol | to 40.00 |

The balance of the composition was a mixture of propellants 11 and 12 (65:35). The various formulations obtained were compared with each other and with the product obtained by omitting silicone and with that obtained by using as silicone the polydimethylsiloxane-polyoxyalkylene copolymer employed in Examples 1 to 6.

The results obtained in the subjective panel tests described above in which a mean ranking score for feel after brushing is obtained as well as a mean valve for the number of brush strokes required to brush the hair free from resin bonding are given below in Table VI. This table also includes combing resistance values for four of the tested hairsprays.

to the better elimination and feel properties (both before and after brush-out) of the hairspray according to the invention. No significant difference in holding properties was observed.

Further Examples illustrating the invention are given below.

| Example: | 7 % | 8 |
|---|---|---|
| Copolymer of vinyl acetate and crotonic acid (National Starch Resyn 28-1310) | 2.00 | 2.25 |
| 2-amino-2-methyl-1-propanol | 0.187 | 0.212 |
| Polydimethylsiloxane-polyoxyalkylene copolymer | 0.02 | 0.20 |
| Ethyl alcohol | to 60.00 | to 40.00 |

TABLE VI

| Silicone | Mean Ranking Score for Feel After Brushing | Mean Number of Brush Strokes for Brushing Out | Cumulative Work for Five Combings |
|---|---|---|---|
| A | 6.2 | 21 | |
| B | 5.0 | 17 | |
| C | 5.6 | 21 | 61 |
| D | 6.6 | 26 | |
| E | 5.8 | 24 | |
| F | 7.7 | 19 | |
| G | 5.7 | 23 | |
| H | 6.3 | 17 | |
| I | 6.0 | 17 | |
| J | 7.9 | 26 | 85 |
| No silicone | 7.7 | 20 | 73 |
| Silicone of Examples 1–6 | 2.4 | 6 | 19 |

These results demonstrate the superior properties of hairsprays formulated in accordance with the present invention.

The various tests described above have been performed using many different batches of the polydimethylsiloxane-polyoxyalkylene copolymer having silicon contents ranging from about 16% to about 20% and viscosities ranging from about 4 to about 8 poises at 25°C and molecular weight of about 1400 to 2200. All batches gave similar results in the tests to the silicone glycol present in the formulations of the above Examples.

The superior properties of hairsprays in accordance with the invention as demonstrated by the above tests performed in the laboratory have been borne out by a number of tests performed by hairspray users. These tests are referred to below.

The aerosol hairspray composition of each of Examples 1 to 4 was tested in vivo against the corresponding hairspray from which the polydimethylsiloxane-polyoxyalkylene copolymer had been omitted. The hairsprays of the Examples were found to be superior in respect of the ease with which the resin could be brushed out of the hair while not differing significantly in their hold attributes. Furthermore, the hair was left with a more natural feel.

Large scale consumer tests employing about 500 hairspray users were carried out with the hairspray of Example 1 and the corresponding hairspray from which the polydimethylsiloxane-polyoxyalkylene copolymer had been omitted showed that the hairspray of the invention was preferred at a significance level of 1 in 100 overall and that this preference was due entirely The balance of both compositions was a mixture of propellants 11 and 12. The ratio of these in Example 7 was 50:50 and in Example 8 65:35.

Using the test procedures described above the presence of the polydimethylsiloxane-polyoxyalkylene copolymer, which was the same as that contained in the formulations of Examples 1 to 6, was shown to improve the ease of brushing out of the hairspray and to improve the feel of the hair after brushing out.

EXAMPLE 9

The following example is illustrative of hairspray compositions for dispensing from containers fitted with a pump spray device.

| | % |
|---|---|
| Copolymer of vinyl acetate and crotonic acid (National Starch Resyn 28-1310) | 4.50 |
| 2-amino-2-methyl-1-propanol | 0.463 |
| Polydimethylsiloxane-polyoxyalkylene copolymer | 0.20 |
| Perfume | 0.15 |
| Water | 10.00 |
| Denatured alcohol | to 100.00 |

What is claimed is:

1. A sprayable film-forming composition suitable for imparting a set to hair comprising in solution in a solvent selected from the group consisting of ethanol, isopropanol, methylene chloride, methoxyethanol, 2-ethoxyethanol and mixtures thereof with water,
   a. from about 0.1% to about 7.5% by weight of the composition of a film-forming resin for imparting a set to hair; and
   b. from about 0.5% to about 15% by weight of said film-forming resin of a polydimethylsiloxane-polyoxyalkylene block copolymer, wherein each oxyalkylene group is selected from the group consisting of oxyethylene and oxypropylene, said block copolymer comprising dimethylsiloxane ($-Si(CH_3)_2O-$) units and units of the formula $-Si(CH_3)[(CH_2)_n(OCH_2CHR')_pOR]O-$ where $n$ is selected from the values of 0 and 3, each $R'$ is selected from the group consisting of hydrogen and methyl, $p$ represents the average number of oxyalkylene groups and R is selected from the group consisting of hydrogen and alkyl containing 1 to 5 carbon atoms, and said block copolymer having a silicon content of from 15% to 25% by weight, a molecular weight of from 1200 to 5000 and a viscosity at 25°C of from 3 to 10 poises.

2. An aerosol hairspray composition suitable for imparting a set to hair comprising in solution in a mixture of from about 10% to 70% by weight of an organic solvent selected from the group consisting of ethanol, isopropanol, methylene chloride, methoxyethanol and 2-ethoxyethanol and from about 30% to about 90% by weight of a liquefied normally gaseous propellant,
   a. from about 0.1% to about 7.5% by weight of the composition of a film-forming resin for imparting a set to hair; and
   b. from about 0.5% to about 15% by weight of said film-forming resin of a polydimethylsiloxane-polyoxyalkylene block copolymer.

wherein each oxyalkylene group is selected from the group consisting of oxyethylene and oxypropylene, said block copolymer comprising dimethylsiloxane ($-Si(CH_3)_2O-$) units and units of the formula $-Si(CH_3)[(CH_2)_n(OCH_2CHR')_pOR]O-$ where $n$ is selected from the values of 0 and 3, each $R'$ is selected from the group consisting of hydrogen and methyl, $p$ represents the average number of oxyalkylene groups and R is selected from the group consisting of hydrogen and alkyl containing 1 to 5 carbon atoms, and said block copolymer having a silicon content of from 15% to 25% by weight, a molecular weight of from 1200 to 5000 and a viscosity at 25°C of from 3 to 10 poises.

3. A composition according to claim 1 wherein the film-forming resin is selected from the group consisting of polyvinylpyrrolidone, a copolymer of from 92.5 to 87.5% vinyl acetate and from 7.5 to 12.5% crotonic acid; a terpolymer of from 7 to 89% vinyl acetate, from 6 to 13% crotonic acid and from 5 to 80% of a vinyl ester of a branched-chain saturated aliphatic monocarboxylic acid; a copolymer of from 20 to 60% N-vinylpyrrolidone and from 40 to 80% vinyl acetate; a copolymer of maleic anhydride (1 mole) and a $C_2$ to $C_4$ olefin (1 mole); and a copolymer of methyl vinyl ether and malic anhydride in a molar ratio of about 1:1.

4. In a hairspray composition for imparting a set to hair and comprising dissolved in a non-toxic cosmetic vehicle a film-forming hairspray resin and a silicon-containing polymer, the improvement which is characterised in that the silicon-containing polymer is a polydimethylsiloxane-polyoxyalkylene block copolymer, wherein each oxyalkylene group is selected from the group consisting of oxyethylene and oxypropylene, said block copolymer comprising dimethylsiloxane ($-Si(CH_3)_2O-$) units and units of the formula $-Si(CH_3)[(CH_2)_n(OCH_2CHR')_pOR]O-$ where $n$ is selected from the values of 0 and 3, each $R'$ is selected from the group consisting of hydrogen and methyl, $p$ represents the average number of oxyalkylene groups and R is selected from the group consisting of hydrogen and alkyl containing 1 to 5 carbon atoms, and said block copolymer having a silicon content of from 15% to 25% by weight, a molecular weight of from 1200 to 5000 and a viscosity at 25°C of from 3 to 10 poises, said block copolymer being present in the hairspray composition in an amount of from 0.5 to 15% by weight of the hair setting resin.

5. An improved method of setting hair by spraying thereon a hairspray composition comprising a solution in an organic solvent of a film-forming resin and a silicon-containing polymer, wherein the improvement consists in that the silicon-containing polymer is a polydimethylsiloxane-polyoxyalkylene block copolymer, wherein each oxyalkylene group is selected from the group consisting of oxyethylene and oxypropylene, said block copolymer comprising dimethylsiloxane ($-Si(CH_3)_2O-$) units and units of the formula $-Si(CH_3)[(CH_2)_n(OCH_2CHR')_pOR]O-$ where $n$ is selected from the values of 0 and 3, each $R'$ is selected from the group consisting of hydrogen and methyl, $p$ represents the average number of oxyalkylene groups and R is selected from the group consisting of hydrogen and alkyl containing 1 to 5 carbon atoms, and said block copolymer having a silicon content of from 15% to 25% by weight, a molecular weight of from 1200 to 5000 and a viscosity at 25°C of from 3 to 10 poises, the block copolymer being present in the hairspray composition in an amount of from 0.5 to 15% by weight of the hair setting resin.

* * * * *